United States Patent [19]

Strong et al.

[11] 4,436,429
[45] Mar. 13, 1984

[54] SLURRY PRODUCTION SYSTEM

[75] Inventors: William A. Strong, Rte. 11, Box 1150, Brinkley Rd., Pine Bluff, Ark. 71611; Kenneth Church, Pine Bluff, Ark.

[73] Assignee: William A. Strong, Pine Bluff, Ark.

[21] Appl. No.: 424,400

[22] Filed: Sep. 27, 1982

Related U.S. Application Data

[62] Division of Ser. No. 262,754, May 11, 1981.

[51] Int. Cl.³ .............................................. B01F 3/12
[52] U.S. Cl. .......................................... 366/2; 366/17; 366/21; 366/40; 366/43; 366/64; 366/132; 366/134; 366/142; 366/152; 366/191; 366/241
[58] Field of Search ....................... 366/16, 17, 20, 21, 366/28, 29, 30, 40, 43, 65, 131, 132, 134, 142, 151, 153, 160, 162, 250, 2, 3, 13, 64, 152, 191, 241; 73/54, 291; 137/2, 4, 12, 14, 92

[56] References Cited

U.S. PATENT DOCUMENTS

| | | |
|---|---|---|
| 1,825,155 | 9/1931 | Meyers . |
| 3,425,667 | 2/1969 | Schutte et al. ...................... 366/132 |
| 4,257,710 | 3/1981 | Delcoigne et al. . |
| 4,362,033 | 12/1982 | Young ............................... 366/142 |

Primary Examiner—Robert W. Jenkins
Assistant Examiner—Arthur D. Dahlberg
Attorney, Agent, or Firm—Stephen D. Carver

[57] ABSTRACT

A slurry mixing and pumping system adapted to automatically control both slurry viscosity and product output volume. Water and raw gypsum delivered to a mixing vat are thoroughly blended by a hydraulically powered agitator blade within the vat. Hydraulic pressure variations experienced by the agitator motor are translated into pneumatic viscosity control signals by a process controller. An air actuated water valve driven by the controller varies water input into the vat to effectuate vicosity correction. Means responsive to vat head level controls output volume.

11 Claims, 3 Drawing Figures

SLURRY PRODUCTION SYSTEM

This is a division, of application Ser. No. 262,754 filed 05/11/81.

BACKGROUND OF THE INVENTION

The present invention relates generally to material mixing devices. Most particularly, the present invention is concerned with a mixing system adapted to control the quantity and viscosity of a slurry mixture comprised of gypsum and water. United States Class 137, Subclass 92, believed most relevent to classification.

Slurry mixtures may be formed from a variety of substances. One example is gypsum. Gypsum may be mixed in some form of tub or reservoir with a continuous mixing agitator blade. The slurry output is then pumped toward a remote location. To facilitate pumping the consistency of the mixture must be carefully controlled. Calcined gypsum will quickly hydrate when mixed with water. The ultimate strength of the gypsum-water mix depends primarily on the ratio of gypsum to water. The higher the ratio of gypsum to water, the greater the strength of the resultant hardened gypsum.

Since gypsum and water start hydrating immediately after they are mixed, the "setting interval" is of such short duration that the mix must be blended and pumped within a matter of ten to fifteen minutes. This factor has necessitated widespread employment of continuous mixing and pumping operations. The mixing vat employed for mixing is usually of cylindrical dimensions in the form of a tub. A water ring fabricated upon the upper periphery of the tub uniformly introduces water into the interior, whereupon a lower agitator blade mixes water with gypsum. Gypsum may be dumped directly into the mixing tub, or it may be conveyed by augers or the like. The consistency of the mix depends upon the ratio of the amount of water entering the tub and the rate at which gypsum is fed into the mixing tub.

In known prior art mixing operations the ratio of solid or aggregate material (i.e. gypsum) to liquid (i.e. water) may vary undesirably as product bags are periodically emptied into the mixing tub by workmen.

Basic prior art devices related to mixing are described in U.S. Pat. Nos. 1,762,081 issued to G. Schleicher June 3, 1930; 3,820,760, issued to Milik on June 28, 1974; 2,689,114 issued to Hammond on Sept. 14, 1954; and, 419,200 issued to Kahlengerg on Jan. 14, 1980. Mixing devices particularly adapted for handling concrete or the like are disclosed in U.S. Pat. No. 3,188,069, issued to W. A. Strong, a co-inventor hereof, on June 8, 1965; and U.S. Pat. No. 3,243,163 issued to G. Brown Mar. 29, 1966. The latter Brown patent discloses a variety of systems for mixing a plurality of varying ingredients as desired. An expansion mixer system is described by Frost in U.S. Pat. No. 3,986,707, issued Oct. 19, 1976.

In the prior art it has also been suggested to regulate viscosity of a slurry mixture with a derived signal employed to control the introduction of water. The control signal is typically derived down stream from the slurry output pump, and a variety of means may be employed to generate the signal. In U.S. Pat. No. 2,896,656, issued to Allen on July 28, 1959 a branch pipe is employed to magnetically sense slurry viscosity. A control circuit generates a signal for varying mixing water introduced via an "upstream" water control valve. Coats, issued U.S. Pat. No. 3,195,866 on July 20, 1965, monitors agitator blade motor current to derive a control signal for varying water inputted into the mixing vat. C. D. Huntington, issued U.S. Pat. No. 3,129,928 on Apr. 21, 1964, discloses a system for sensing the electrical conductivity of a slurry mixture, and for generating a water control signal in response to varying slurry conductivity.

U.S. Pat. No. 3,300,193, issued to C. O. Badgett on Jan. 24, 1967, discloses a blending system into which a plurality of aggregates are continuously fed. A separate rate control system is employed in conjunction with each of the aggregate feeders for controlling delivery of the incoming raw materials. Radiation is employed to measure the rate of travel of constituent aggregates, whereby to generate a control signal which regulates the conveyed mass of incoming raw materials to maintain a uniform product blend.

SUMMARY OF THE INVENTION

The present invention comprises a system for continuously blending a slurry mixture and for delivering the mixture to a remote location. The viscosity of the slurry mixture is continuously monitored to generate a control signal which regulates water input to maintain a desired slurry viscosity. Moreover, a cooperating pump control system is employed to maintain appropriate slurry output volume independently of automatic viscosity control corrections. In this manner both the quantity and quality of a slurry mixture may be continuously and automatically controlled within relatively precise limits.

The system contemplates a mixing vat into which water and raw gypsum are controllably delivered. An optional gypsum hopper adapted to periodically receive the contents of commercial gypsum bags uniformly conveys raw gypsum directly into the vat through an auger system. A hydraulically powered agitator blade within the vat mixes the incoming gypsum with water, and as slurry consistency changes the hydraulic pressure necessary to operate the agitator varies. Hydraulic pressure in the agitator motor circuit is continuously monitored by a process controller, which generates a pneumatic control signal for a water control network. Incoming water passes through an air-controlled valve. When the slurry mixture is too thick, the agitator blade resistance increases. The resultant increase in hydraulic pressure (experienced by the hydraulic agitator motor) is sensed by the processor, which initiates a correction signal. The correction signal is delivered to the air controlled valve increasing liquid input. Likewise, when viscosity exceeds desired limits, the air controlled valve restricts liquid flow.

To properly control the slurry output rate independently of the automatic viscosity control previously discussed, the head, or slurry level within the mixing vat is continuously monitored. Preferably an ultrasonic monitor system is employed. The monitor system regulates an electric slurry output pump motor through an intermediary power control network, thereby controlling the speed of the pump and thus the quantity of mixture outputted by the system. Thus product output volume may be increased merely by increasing raw material input.

The ultrasonic system preferably comprises an open channel metering device including an ultrasonic transducer mounted over the mixing vat which generates a signal dependent upon slurry head. This signal is received by an input module in the aforementioned intermediary power control network. The latter SCR network directly controls output pump motor speed to regulate output volume.

Through the concurrent use of the viscosity and output volume control systems the quality and quantity of desired slurry mixtures are precisely and automatically controlled. However, a plurality of manual controls are included for system flexibility.

Thus a basic object of this invention is to automatically and continuously control both the quality and quantity of a slurry product outputted from a mixing system.

Another object of this invention is to automatically control the viscosity of a slurry mixture in an automated mixing system.

A related object of the present invention is to automatically control the viscosity of a slurry mixture in an automated mixing system.

A related object of the present invention is to automatically control slurry output volume substantially independently of associated automatic viscosity control apparatus.

A further object of the present invention is to provide a slurry mixing system of the character described which may be successfully and economically employed in conjunction with a wide variety of industrial applications.

Another object of the present invention is to provide a system for automatically controlling slurry viscosity and output volume.

A still further object of the present invention is to precisely control the output volume of a slurry mixture pumping system. To this effect an ultrasonic system is preferably employed to continuously monitor the mixing vat head, and to generate an appropriate correction signal for controlling output pump speed.

Yet another object of the present invention is to hydraulically derive a water control signal from variations in slurry consistency, whereby to regulate slurry viscosity.

Another important object of the present invention is to provide a slurry mixing system capable of regulating product output volume and/or product viscosity, which system is capable of handling a variety of different slurry products. For example, the present system may be employed in conjunction with wood pulp control during paper manufacture.

These and other objects and advantages of this invention, along with features of novelty appurtenant thereto, will appear or become apparent in the course of the following descriptive sections.

BRIEF DESCRIPTION OF THE DRAWINGS

In the appended drawings, which form a part of the specification and which are to be construed in conjunction therewith, and in which like reference numerals have been employed throughout to indicate like parts in the various views.

DETAILED DESCRIPTION OF THE DRAWINGS

Figure 1:
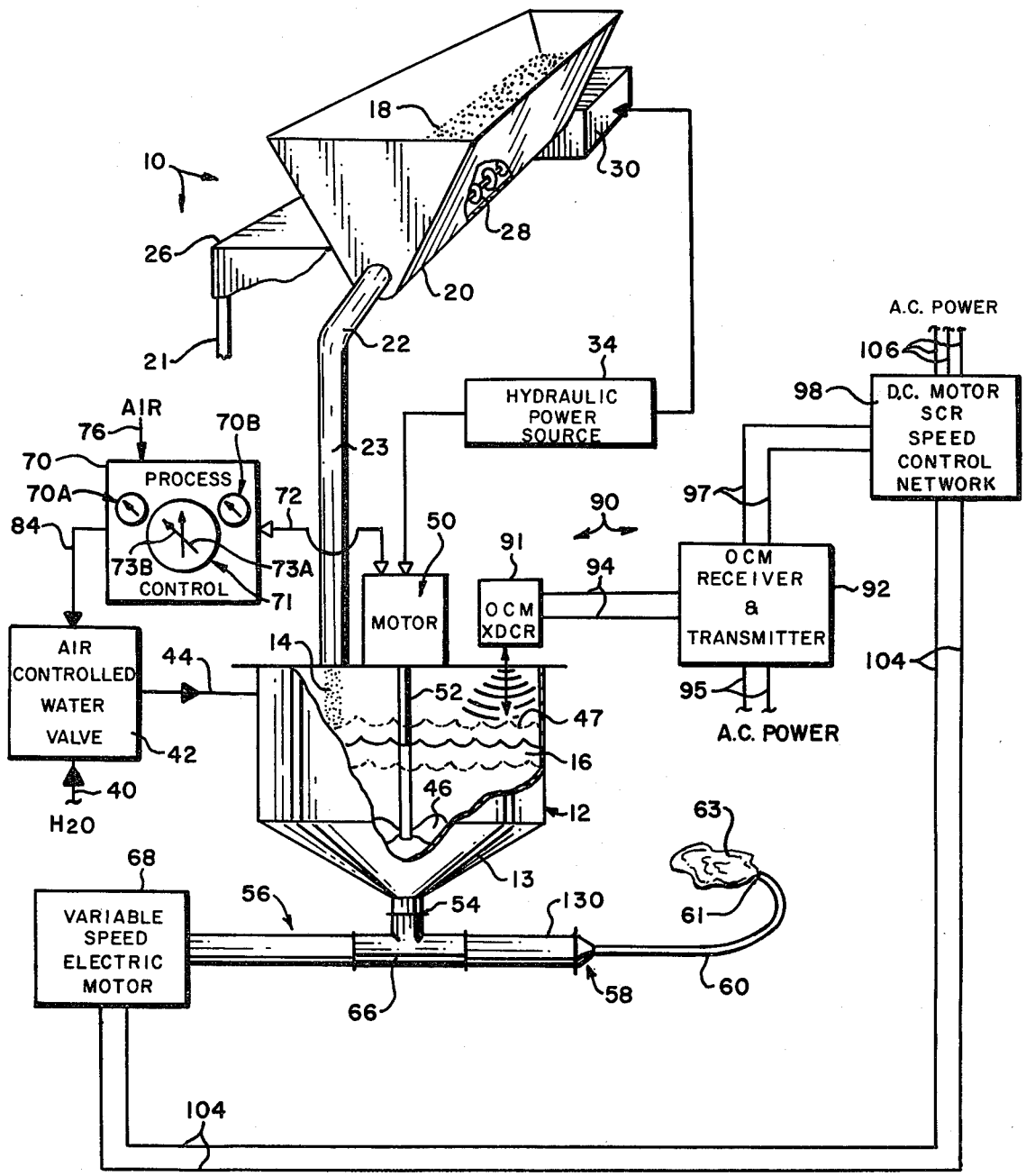
FIG. 1 is a combined pictorial and block diagram illustrating the flow path of the preferred mode of the present invention, with parts thereof broken away for clarity.

Referring initially to FIG. 1 of the appended drawings, the reference numeral 10 generally designates a system for continuously blending and pumping a slurry mixture, which system is adapted for automatically controlling the viscosity of the blend and/or controlling slurry output volume. System 10 includes a plurality of operationally spaced-apart components which are preferably controlled from a central location.

System 10 includes a rigid, generally cylindrical mixing vat or tub 12 which, as will be recognized by those skilled in the art, is adapted to be rigidly secured above an appropriate supporting surface. Vat 12 is adapted to receive a powdered mineral or aggregate 18 such as gypsum, and to mix some with a liquid, i.e. water, yielding a slurry mixture 16. Preferably, the apparatus 10 is employed for the preparation and pumping of calcined gypsum and water. However, the system may also be successfully employed in conjunction with wood pulp control during paper manufacture. Additionally system 10 is adapted to process cementitious and/or asphalt slurry mixtures. As will be readily appreciated by those skilled in the art, the physical or mechanical dimensions or characteristics of the mixing vat, the hopper, and other associated hardware must be appropriately selected for the intended application.

Dry aggregate or product 18 (i.e. gypsum) to be mixed with a liquid (i.e. water) may be dumped out of shipping bags into a remote hopper 20, whereupon raw material may be conveyed through conventional pipe 22 for dumping into the interior of vat 12. Preferably, hopper 20 is rigidly disposed at an elevated position above vat 12 and is secured by a conventional frame 26, elevated by stanchions 21. Product (i.e. gypsum) is conveyed outwardly of hopper 20 by an auger 28 powered by a conventional hydraulic motor 30 driven by a conventional, external hydraulic power source 34.

Liquid (i.e. water) is preferably inputted into system 10 via a conventional external line 40 which passes through a water control valve 42. Valve 42 essentially meters or controls the passage of liquid (i.e. water) into vat 12 via line 44. The mix (i.e. water and gypsum) within vat 12 is blended by an agitator blade 46 which is disposed beneath the slurry head 47. Blade 46 is linked to hydraulic drive motor 50 by a conventional shaft 52. As agitator blade 46 is rotated, the mixture will be quickly and thoroughly blended together. The bottom 13 of recepticle 12 is preferably in the form of an inverted fustroconical section, which is secured by conventional flanges 54 to an output conduit 56. Conduit 56 is adapted to be coupled to an elongated hose 60 which may be extended to the job site. The end 61 of the hose may terminate in a conventional hose fitting for controlling the slurry output 63. A variable speed electric motor 68 is preferably employed to drive a suitable pump, the components of which are housed within conduit 56.

The viscosity of slurry mixture 16 is controlled by sensing the hydraulic back pressure experienced by motor 50. To this effect the process controller 70 monitors the high pressure side of the hydraulic input of motor 50 via a conventional hydraulic line 72. Air is delivered to consistency control 70 via a pneumatic connection 76, coupled to a conventional external compressed air source. Control 70 generates a variable pneumatic control signal outputted on line 84 which is delievered to water control valve 42 to vary the water entering vat 12 in response to the viscosity of the slurry mixture 16.

As the ratio of solid (i.e. gypsum) to liquid (i.e. water) within vat 12 increases, the resistance experienced by agitator blade 46 will increase proportionally with increased mixture viscosity. Consequently, hydraulic pressure necessary to operate motor 50 will increase, and this will be sensed by control 70. As a result, the derived pneumatic signal outputted on line 84 will further open water control valve 42 to increase liquid entering vat 12, whereby to lower slurry viscosity. The slurry viscosity or "quality" of the mix is thus controlled by continuously monitoring agitator resistance, and by proportionally adjusting injection water rates.

Controller 70 includes a gauge 70 A which monitors air pressure, and a companion pressure gauge 70B which monitors outgoing air pressure on line 84 (which controls consistency valve 42). Centrally positioned, calibrated control dial 71 includes a first pointer needle 73a which provides a viscosity indication, and a manually selectable needle 73B which may be "dialed up" by the operator to select a desired viscosity (a desired air pressure signal).

Slurry output volume is maintained by monitoring the head level 47 of the slurry within receptIcle 12 to generate a correction signal. To this effect an ultrasonic, open channel metering (O.C.M.) device, generally designated by the reference numeral 90, is perferably employed. Device 90, which includes sensor head 91 secured above vat 12, is powered by lines 95. Since the head height is a direct function of output volume, signals transmitted to the O.C.M. receiver and transmitter unit 92 via lines 94 will enable generation of a control voltage which is transmitted to a conventional electric control network 98 via lines 97. The control network 98 directly controls pump motor 68 via lines 104, receiving source a.c. power via input lines 106. The variable speed electric motor 68 forces slurry out from vat 12 for delivery via hose 60.

The preferred open channel metering system operates by measuring the total time for an ultrasonic pulse to complete a round trip from sensor 91 to slurry head 47, and converting this measurement to a distance signal. System 90 is coupled to an SCR Control network 98, which controls pump motor speed.

In the best mode embodiment valve 42 comprises a Jordan brand air controlled water valve, model ITE 70-D13-15-R. Process control 70 preferably comprises an Ametek Brand #BB2102-3360. The preferred OCM system is available from the Milltronics Company in Arlington, Texas. Network 98 may comprise a Ratiotrol III U-Series SCR drive.

Figure 2:
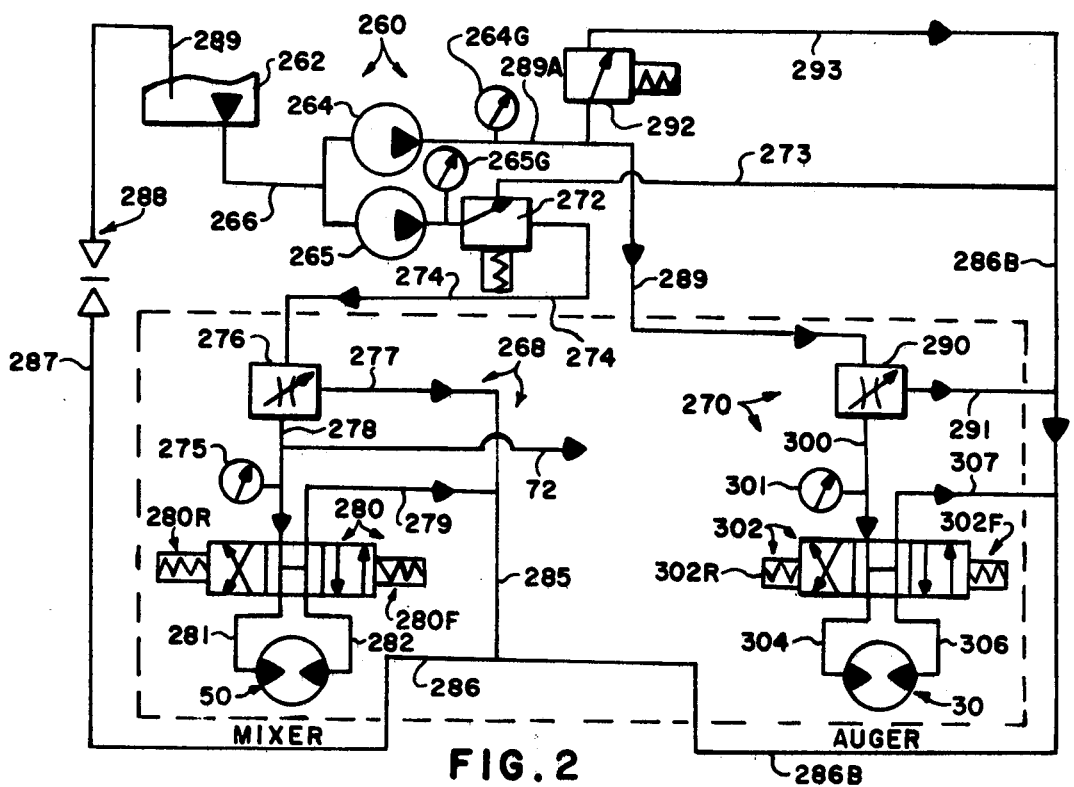
FIG. 2 is a schematic diagram illustrating the hydraulic circuit preferably employed in the best mode embodiment of the present invention; and, FIG. 3 is an electrical control diagram preferably employed in the best mode embodiment.

The preferred hydraulic circuit (FIG. 2) is generally designated by the reference numeral 260. Hydraulic fluid stored within conventional sump strainer 262 is inputted into one or more hydraulic pumps 264, 265 via feed line 266. The separate hydraulic mixer and auger subcircuits 268, 270 are powered by pumps 265, 264 respectively. Pump 265 transmits its high pressure output via a conventional hydraulic relief valve 272 and a line 274 to a flow control valve 276. The output of valve 276 is delivered via a line 278 to a junction with hyraulic pressure sensing line 72 and a gauge 275. Line 278 also leads to a conventional spring returned, solenoid-controlled directional valve 280, the outputs 281, 282 of which are connected across hydraulic mixer motor 50. Hydraulic fluid is returned to sump 262 via return lines 273, 277, 279, 285, and/or 287. A conventional filter 288 connects return line 287 to the input 289 of sump 262. Mixer circuit hydraulic pressure is monitored by gauges 265G and 275. Valve 280 may be moved electrically between "mixer forward" and "mixer reverse" positions. To this effect, valve 280 is controlled by relay 280F in the forward mode, and 280R in the reverse mode (FIG. 3).

Hydraulic auger-circuit 270 is similar to mixer-circuit 268, and similar conventional components may be employed. Pump 264 provides an output on a line 289A which leads to a flow control valve 290, similar to valve 276. Line 289 is also coupled to relief valve 292 which is connected to return line 286B via relief line 293. Similarly, relief passage 291 interconnects valve 290 with return path 286B. Line 300 transmits pressure to hydraulic control valve 302, the outputs 304, 306 of which are connected across auger motor 30. Valve 302 is connected to return line 286B by line 307.

Figure 3:
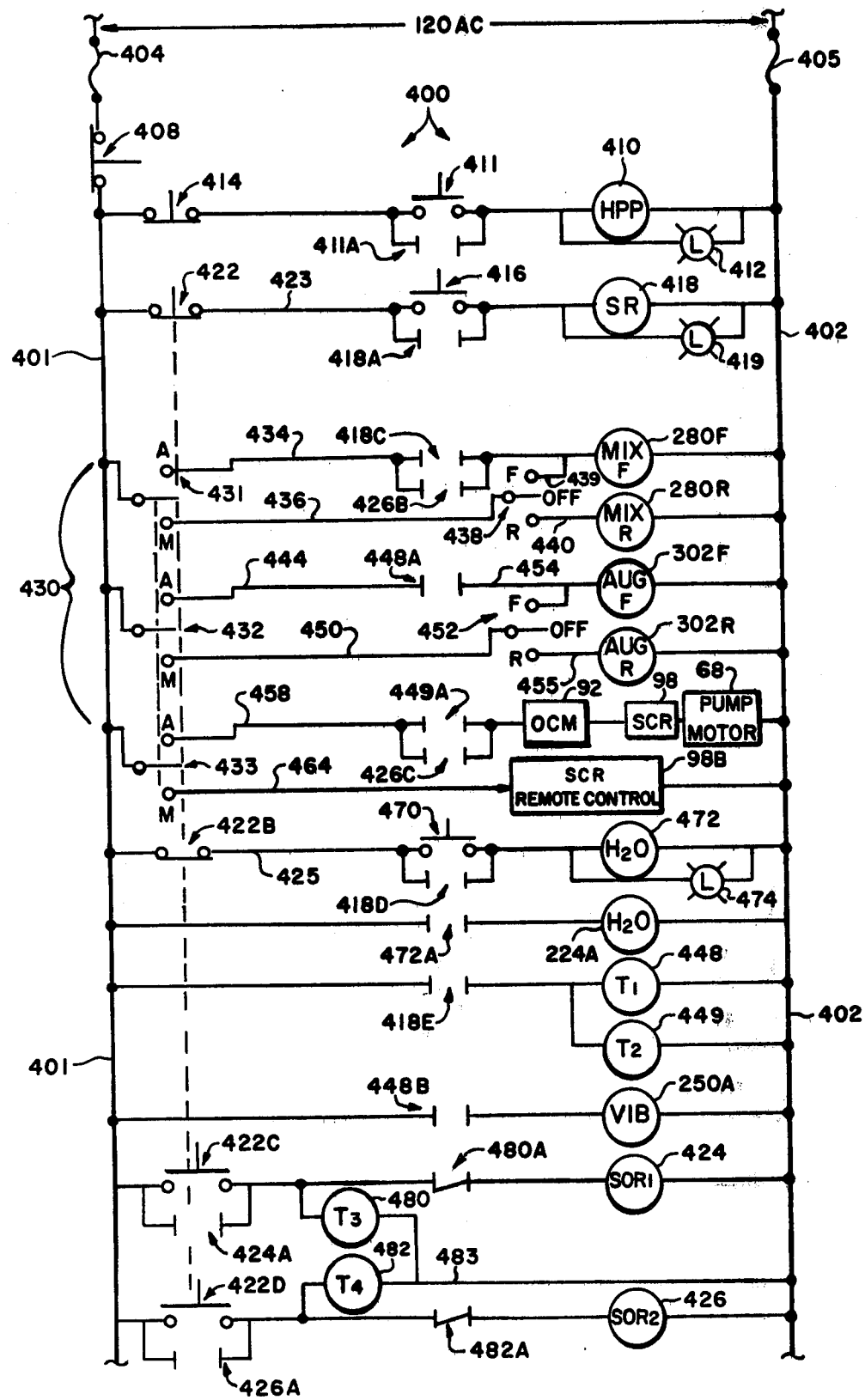

With reference now to FIG. 3, a preferred electrical control circuit, generally designated by the reference numeral 400, is illustrated. Busses 401, 402 are coupled through conventional protective fuses 404, 405 across an A.C. source, nominally 120 v.a.c. Power delivered to the network may be quickly, manually disabled by emergency stop switch 408.

Hydraulic power pack 410 is started by switch 411, which is latched by relay contacts 411A (part of the hydraulic power pack). When HPP 410 is actuated, indicator light 412 will be illuminated.

The slurry agitator apparatus is started by depressing pushbutton switch 416 which immediately actuates slurry relay 418, being latched by slurry relay-controlled switch elements 418A. The slurry motor immediately starts as either the slurry forward field 280F or slurry reverse field 280R configuration of slurry hydraulic valve 280 (FIG. 2) is selected. When slurry control is thus actuated, warning light 419 will immediately be illuminated. Slurry relay 418 additionally closes contacts 418C, 418D, and 418E. Contacts 418C actuate hydraulic mixer valve 280 (FIG. 5) by energizing forward mode field 280F. Contacts 418D energize a relay 472 to open an optional series connected valve to allow valve 42 (FIG. 1) to operate. Contacts 418E initiate operation of timers 448, 449.

Normally closed "slurry off" pushbutton 422 will disable slurry relay 418, and unlatch switch 416. Slurry stop switch 422 also operates switch contacts 422B, 422C, and 422D. Switch portion 422C is immediately latched when first slurry off relay 424 closes elements 424A. Slurry off switch section 422D actuates a second slurry off relay 426 which closes points 426A to latch switch 422D. The second slurry off relay 426 also closes points 426B and 426C, to maintain the mixer and pump motors operational during the end rinse cycle.

Auto/manual select switch 430 controls three sets of single pole, double throw elements, 431, 432, 433. When in the upper position the automatic mode is selected; the lower position is the manual mode. In the automatic mode the mixer, auger, and pump previously discussed operate in the forward mode. Manual control will not usually be required during steady state forward operation.

Switch element 431 energizes line 434 when switch 430 is in the automatic mode. Power will thus be transmitted to mixer forward valve solenoid 280F, since contacts 418C (or 426B) will be closed. In the manual mode switch 431 energizes line 436 to energize forward- /reverse switch 438. When switch 438 is switched directly to line 439 mixer forward valve 480 (i.e. solenoid 280F) is actuated. When switched to line 440 switch 438 reverses hyraulic valve 280, by energizing field 280R.

Auto/manual select switch elements 432 provide power along line 444 in the automatic mode. Switch elements 418E close when slurry start switch 416 is depressed, thereby actuating timers 448, 449. Timer 448 controls contacts 448A, 448B. When contacts 448A are clsoed, auger forward valve solenoid 302F will operate hydraulic valve 302 in the forward mode. When manual/auto contacts 432 are deflected into the manual mode to energize line 450, forward/reverse switch 452 may either energize line 454 to manually switch the auger into the forward mode, or, for rinsing purposes etc., line 455 may be energized to reverse hydraulic auger switch 302. Timer 448 will determine the auger automatic operation time interval with contacts 448A. Optional vibrator 250A is controlled by timer contacts 448B. Manual/auto contacts 433 energize line 458 in the automatic mode. When timer 449 closes contacts 449A, or when contacts 426C are closed by slurry off relay 426, OCM unit 92 is actuated and it drives SCR circuit 98 to power pump motor 68. Alternatively SCR remote control circuit 98B can be operated by energizing line 464. Unit 98B is part of the SCR control package.

Stop slurry switch contacts 422B must be conductive to allow either switch 470 or contacts 418D (controlled by slurry solenoid relay 418), to actuate water valve relay 472. When valve relay 472 is actuated, warning light 474 responds, and contacts 472A are closed to actuate field 224A. Field 224A, opens a conventional electric water valve to permit valve 42 (FIG. 1) to operate.

Timers 480 and 482 are started when slurry off switch 422 is first depressed. Switch 422C starts timer 480, and switch 422D starts timer 482. Switches 422C, 422D are respectively latched by contacts 424A (closed by slurry off relay 424) and 426A (closed by slurry off relay 426). Timers 480, 484 open normally closed contacts 480A, 482A respectively to turn off slurry-off relays 424, 426 after a predetermined rinse cycle at the end of an operation.

OPERATION

For automatic operation switch 430 is placed in the automatic position. The hydraulic start button 411 and slurry start button 416 are then depressed, closing a plurality of contacts previously discussed. The consistency control button 470 is depressed to allow water valve 42, previously discussed, to operate. At this time water starts into the mixer, the mixer starts, and the primary timers 448, 449 are actuated. Consistency control will be in effect until timers 448, 449 time out, and output pump speed will automatically be controlled by the OCM system. After timer 448 times out, opening contacts 448A, 448B, the auger valve 302 (FIG. 2) will be closed, stopping motor 30. After timer 449 times out, pump relay 459 opens since contacts 449A will be opened, and output stops.

From the foregoing, is will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An automatic slurry production system comprising:
    means for receiving a powdered or aggregate raw material material and a liquid to be mixed therewith whereby to form a slurry mixture;
    agitator means for blending said slurry mixture;
    hydraulic motor means for actuating said agitator means;
    means for sensing hydraulic pressure variations experienced by said hydraulic motor means whereby to derive a control signal proportional to slurry viscosity;
    valve means for controlling the introduction of liquid into said means for receiving a powdered or aggregate raw material, said valve means responsive to said control signal whereby liquid flow rate is generally proportional to the viscosity of said slurry mixture;
    pump means for outputting slurry from said system;
    means for regulating slurry output volume, said last mentioned means comprising:
        sensing means for monitoring slurry head level within said means for receiving a powdered or aggregate raw material; and,
        means responsive to said last mentioned sensing means for controlling the speed of said pump means whereby to control slurry output volume in response to said slurry head level.

2. An automatic slurry production system comprising:
    means for receiving a powdered or aggregate raw material and a liquid to be mixed therewith whereby to form a slurry mixture;
    agitator means for blending said slurry mixture;
    hydraulic motor means for actuating said agitator means;
    means comprising hydraulic pressure variations experienced by said hydraulic motor means whereby to derive a control signal proportional to slurry viscosity; said last mentioned means comprising process control process means adapted to generate a pneumatic signal corresponding to said control signal in response to hydraulic pressure variation;
    valve means for controlling the introduction of liquid into said means for receiving a powdered or aggregate raw material, said valve means responsive to said control signal whereby liquid flow rate is generally proportional to the viscosity of said slurry mixture said valve means comprising an air-operated water valve adapted to be actuated in response to said pneumatic signal; and,
    pump means for outputting slurry from said system.

3. Automatic slurry mixing and pumping apparatus comprising:
    vat means for receiving a powdered or aggregate raw incoming material and a liquid to be mixed therewith whereby to form a slurry mixture;
    agitator means disposed within said vat means for blending said slurry mixture;
    means for actuating said agitator means;

pump means in fluid flow communication with said vat means for outputting slurry from said apparatus;

means for automatically controlling output volume, said last mentioned means comprising:
means for monitoring slurry head level within said vat means, said means for monitoring slurry head level comprising an ultrasonic, open channel monitoring system;
means responsive to said head monitoring means for controlling the speed of said pump means whereby to regulate the volume of slurry outputted from said apparatus;
variable speed electric motor means for controlling said pump means in response to said ultrasonic open channel monitoring systems;
means for continuously and automatically regulating slurry viscosity concurrently with operation of said means for controlling slurry output volume; and,
said means for actuating said agitator means comprising hydraulic motor means and said slurry viscosity regulator means comprising:
means for sensing hydraulic pressure variations experienced by said hydraulic motor means whereby to derive a control signal porportional to slurry viscosity; and,
valve means for controlling the introduction of liquid in to said vat means, said valve means responsive to said control signal whereby liquid flow rate is generally proportional to the viscosity of said slurry mixture.

4. A slurry blending and pumping machine comprising:
vat means adapted to receive raw material and a liquid whereby to form a slurry mixture;
means for inputting raw material into said vat means;
valve means responsive to a control signal for controllably delivering liquid into said vat means;
agitator means disposed within said vat means for blending said slurry mixture;
hydraulic motor means for actuating said agitator means; process control means for sensing hydraulic pressure variations experienced by said hydraulic motor means whereby to derive a pneumatic control signal in proportion to slurry viscosity, said control signal coupled to said valve means for controlling same;
means for pumping slurry mix out of said machine; said pump means driven by a variable speed electric motor;
means for concurrently regulating slurry output volume; said last mentioned means comprising:
sensing means for monitoring slurry head level within said vat means; and,
motor power supply means responsive to said last mentioned sensing means for variably powering said electric motor whereby to control the speed of said pump means.

5. A method of continuously mixing and pumping slurry mixtures, the method comprising the steps of:
introducing powdered or aggregate raw incoming material and a liquid to be mixed together in a mixing vat;
hydraulically agitating materials within said vat to form a slurry mixture; monitoring the hydraulic pressure necessary to perform said hydraulic agitating step and deriving a control signal proportional to said hydraulic pressure;
controlling the introduction of liquid into said vat with said control signal, whereby liquid flow rate is directly proportional to the viscosity of said slurry mixture;
pumping mixture slurry from said vat to a desired location; and,
regulating slurry output volume concurrently with said viscosity control step, said last mentioned step including the step of:
sensing the slurry head level within said vat; and controlling said pumping step in response to said last mentioned sensing step whereby to control slurry output volume, whereby the volume of regulated viscosity slurry mixture outputted is directly proportional to the rate at which incoming raw powdered or aggregate material is introduced into said vat.

6. An automatic slurry production system comprising:
means for receiving a powdered or aggregate raw material and a liquid to be mixed therewith whereby to form a slurry mixture;
agitator means for blending said slurry mixture;
hydraulic motor means for actuating said agitator means;
means for sensing hydraulic pressure variations experienced by said hydraulic motor means whereby to derive a control signal proportional to slurry viscosity;
valve means for controlling the introduction of liquid into said means for receiving a powdered or aggregate raw material, said valve means responsive to said control signal whereby liquid flow rate is generally proportional to the viscosity of said slurry mixture;
pump means for outputting slurry from said system; and,
means for regulating slurry output volume comprising:
ultrasonic sensing means for monitoring slurry head level within said means for receiving a powdered or aggregate raw material; and,
means responsive to said ultrasonic sensing means for controlling the speed of said pump means whereby to control slurry output volume in response to said slurry head level.

7. The combination as defined in claim 6 wherein:
said means for sensing hydraulic pressure variations comprises process control means adapted to generate a pneumatic signal corresponding to said control signal in response to hydraulic pressure variations; and,
said valve means for controlling the introduction of liquid comprises an air-operated water valve adapted to be actuated in response to said pneumatic signal.

8. The combination as defined in claim 7 wherein said pump means is driven by a variable speed electric motor and said means for monitoring and regulating slurry output volume comprises:
sensing means for monitoring slurry head level within said means for receiving a powdered or aggregate raw material; and,
motor power supply means responsive to said last mentioned sensing means for controlling the speed of said electric motor and thus said pump means whereby to control slurry output volume.

9. The combination as defined in claim 8 wherein said sensing means for monitoring slurry head level comprises an ultrasonic open channel monitoring system.

10. Automatic slurry mixing and pumping apparatus comprising:

vat means for receiving a powdered or aggregate raw incoming material and a liquid to be mixed therewith whereby to form a slurry mixture;

agitator means disposed within said vat means for blending said slurry mixture;

hydraulic motor means for actuating said agitator means;

pump means in fluid flow communication with said vat means for outputting slurry from said apparatus;

means for automatically controlling slurry output volume, said last mentioned means comprising:
 ultrasonic monitoring means for monitoring slurry head level within said vat means; and,
 variable speed electric motor means responsive to said ultrasonic head monitoring means for controlling the speed of said pump means whereby to regulate the volume of slurry outputted from said apparatus; and, means for continuously and automatically regulating slurry viscosity concurrently with operation of said means for controlling slurry output volume, said slurry viscosity regulating means comprising:
 process control means for sensing hydraulic pressure variations experienced by said hydraulic motor means whereby to derive a pneumatic control signal proportional to slurry viscosity; and,
 air operated water valve means for controlling the introduction of liquid into said vat means, said valve means responsive to said pneumatic control signal whereby liquid flow rate is generally proportional to the viscosity of said slurry mixture.

11. A slurry blending and pumping machine comprising:

vat means adapted to receive raw material and a liquid whereby to form a slurry mixture;

means for inputting raw material into said vat means;

air operated water valve means responsive to a pneumatic control signal for controllably delivering liquid into said vat means;

agitator means disposed within said vat means for blending said slurry mixture;

hydraulic motor means for actuating said agitator means;

process control means for sensing hydraulic pressure variations experienced by said hydraulic motor means whereby to derive said pneumatic control signal is proportion to slurry viscosity;

means for pumping slurry mix out of said machine;

variable speed electric motor means for driving said pumping means; and, means for concurrently regulating slurry output volume, said last means comprising:
 ultrasonic sensing means for monitoring slurry head level within said vat means; and,
 motor power supply means responsive to said last mentioned sensing means for variably powering said electric motor means whereby to control the speed of said pump means.

* * * * *